United States Patent [19]

Bauer et al.

[11] 4,448,508
[45] May 15, 1984

[54] CUT FILM CASSETTE WITH TWO FILM CHAMBERS

[75] Inventors: Walter Bauer; Heinrich Färber; Jürgen Müller, all of Munich, Fed. Rep. of Germany

[73] Assignee: AGFA-Gevaert Aktiengesellschaft, Leverkusen, Fed. Rep. of Germany

[21] Appl. No.: 379,971

[22] Filed: May 19, 1982

[30] Foreign Application Priority Data

May 20, 1981 [DE] Fed. Rep. of Germany ....... 3119977

[51] Int. Cl.³ .............................................. G03B 17/26
[52] U.S. Cl. ..................................... 354/281; 354/285
[58] Field of Search ............................... 354/276–285; 355/72; 378/182, 188

[56] References Cited

U.S. PATENT DOCUMENTS

| 562,168 | 6/1896 | Brownell | 354/284 |
|---|---|---|---|
| 1,933,823 | 11/1933 | Nagal et al. | 354/284 |
| 2,526,840 | 10/1950 | Bass | 354/91 |
| 2,628,545 | 2/1953 | Kurnick et al. | 354/174 |
| 3,349,683 | 10/1967 | Castedello | 354/285 |
| 3,958,125 | 5/1976 | Zechmair et al. | 378/188 X |
| 4,013,890 | 3/1977 | Conrad | 378/188 X |
| 4,204,724 | 5/1980 | Bauer et al. | 354/281 |
| 4,248,172 | 2/1981 | Krobel et al. | 378/182 X |
| 4,258,263 | 3/1981 | Buldini et al. | 354/276 X |
| 4,350,248 | 9/1982 | Bauer | 378/188 X |

FOREIGN PATENT DOCUMENTS

| 2655462 | 6/1977 | Fed. Rep. of Germany . |
|---|---|---|
| 2750559 | 9/1979 | Fed. Rep. of Germany . |
| 2334983 | 7/1977 | France . |

*Primary Examiner*—John Gonzales
*Attorney, Agent, or Firm*—Peter K. Kontler

[57] ABSTRACT

A cassette with two chambers for discrete cut films has a centrally disposed plate-like partition with two identical sides, and a pair of identical covers each of which is adjacent to a different side of the partition and is pivotably attached to the partition by a hinge for movement between an open and a closed position. The covers have exposure apertures and carry slidable plate-like shutters which can slide in slots of the respective covers to permit or prevent entry of light by way of the respective apertures. The film chambers are separated from each other by the central portion of the partition, and the latter further carries locks for releasably holding the covers in their closed positions. The lock for one of the covers is provided at that side of the partition which is adjacent to the other cover, and vice versa. The hinge or hinges for one of the covers are provided on a first marginal portion of the substantially rectangular partition, and the lock for such one cover is provided on a second marginal portion which is parallel to the first marginal portion. The hinge or hinges and the lock for the other cover are respectively provided on the second and first marginal portions of the partition.

28 Claims, 6 Drawing Figures

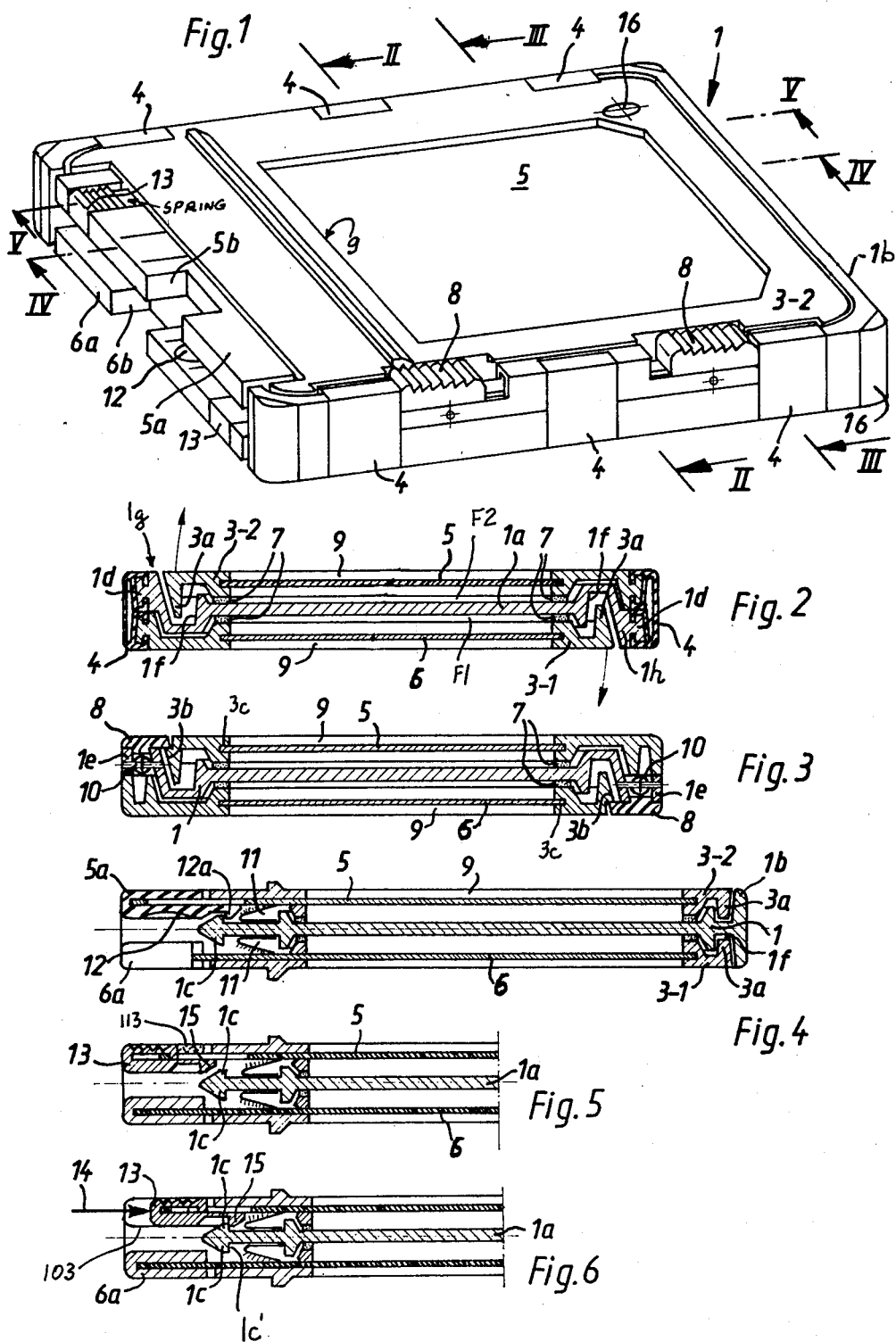

CUT FILM CASSETTE WITH TWO FILM CHAMBERS

BACKGROUND OF THE INVENTION

The present invention relates to cut film cassettes in general, and more particularly to improvements in cut film cassettes for simultaneous reception of two films.

U.S. Pat. No. 3,373,673 granted Mar. 19, 1968 to Craig discloses a film cassette or holder with two outer panels or covers each of which has an exposure aperture or window adapted to be exposed or closed by a discrete plate-like shutter. The shutters are insertable into slots which are provided therefor in the respective covers. The cassette further comprises a main frame which carries the covers. In order to insert a film, the corresponding shutter is removed in a first step and a flap is thereupon moved to open position to allow for insertion of the film into lateral guides of the frame. Such procedure is cumbersome, especially when the film must be introduced in a dark chamber. Furthermore, the patented cassette is rather complex and expensive because it comprises a substantial number of discrete parts.

OBJECTS AND SUMMARY OF THE INVENTION

An object of the invention is to provide a simple, compact and relatively inexpensive cut film cassette or holder for reception of two discrete films.

Another object of the invention is to provide a film cassette wherein the insertion of cut films into or removal of cut films from their respective chambers takes up little time and can be carried out with ease in a dark chamber.

A further object of the invention is to provide a cassette or holder of the above outlined character wherein the films are not likely to be accidentally exposed to radiation.

An additional object of the invention is to provide the cassette with novel and improved distribution of means for supporting and locking the covers in desired positions.

Still another object of the invention is to provide a cassette which can be used as a superior substitute for heretofore known cassettes.

A further object of the invention is to provide a cassette wherein the insertion of cut films into or removal of cut films from their chambers takes up only a fraction of the time which is required for similar manipulations in heretofore known holders cassettes for pairs of cut films.

Another object of the invention is to provide a cassette which can be utilized for medical photography or in photographic cameras which employ cut films rather than rolls.

An additional object of the invention is to provide a cassette which is constructed and assembled in such a way that the shutters need not be removed preparatory to loading of fresh films into the respective chambers.

A further object of the invention is to provide a cassette which can be loaded or relieved of films in a dark chamber or in daylight.

The invention resides in the provision of a holder or cassette for simultaneous reception of two discrete cut films. The cassette comprises a centrally disposed partition or septum having preferably mirror symmetrical first and second sides and spaced-apart parallel first and second marginal portions, at least substantially identical first and second covers, first and second coupling means for articulately connecting the respective covers to the first and second marginal portions of the partition so that each cover is movable between a first or open position in which it is remote (and, if desired, can be completely detached) from and a second or closed position in which it is adjacent to and defines with the respective side of the partition a discrete film chamber (i.e., the partition can constitute a wall which is common to both chambers and is disposed therebetween), and first and second locking means for releasably locking or holding the respective covers in their second or closed positions. The first and second locking means are respectively disposed at the second and first sides of the partition and in the region of the second and first marginal portions.

Each cover has an exposure aperture, and the cassette further comprises first and second shutters which are installed in the respective covers and each of which is movable between first and second positions in which the corresponding aperture is respectively exposed to admit radiation into the corresponding chamber and closed. The covers are preferably formed with suitable slots and the shutters are preferably slidable or reciprocable in such slots between their first and second positions.

Each of the two coupling means preferably comprises a hinge (and more specifically a hinge leaf) and a support for the hinge. The supports of the first and second coupling means are preferably provided on the partition and are respectively disposed at the second and first sides of the partition. The supports of the first and second coupling means are respectively provided on and can be integral with the respective marginal portions of the partition.

Each locking means preferably comprises at least one mobile portion and a stationary portion provided on the partition. The stationary portions of the first and second locking means are respectively provided at the second and first sides and on the second and first marginal portions of the partition. For example, the stationary portions of the first and second locking means can be made integral with the second and first marginal portions of the partition. The marginal portions of the partition are preferably elongated, and the support of the first coupling means is preferably staggered with reference to the stationary portion of the first locking means. The same preferably applies for the stationary portion of the second locking means and the stationary support of the first coupling means.

The aforementioned hinge leaves or hinges can be provided on (and may but need not constitute integral parts of) the corresponding covers. As mentioned above, the supports for such hinges or hinge leaves are provided on and can be made integral with the partition so that the supports of the first and second coupling means are respectively disposed at the second and first sides of the partition.

Each side of the partition can be formed with a substantially circumferentially complete recess or groove, and the inner sides of the covers are then provided with substantially circumferentially complete complementary projections or ridges extending into the corresponding recesses in the second or closed positions of the covers to form therewith labyrinth passageways which prevent the penetration of radiation between the partition and the covers and into the respective film chambers in closed positions of the covers. Each of the recesses and each of the projections can resemble a rectangle which surrounds the respective film chamber.

The aforementioned shutters can constitute thin lightweight plates which are movable in the slots of the respective covers between first and second positions to respectively expose and close the corresponding apertures. Each shutter can be provided with a handgrip portion, and the cassette preferably further comprises first and second latching means for releasably holding the respective shutters in their second positions. Each latching means can comprise a mobile portion provided on the respective shutter and cooperating with the partition to releasably hold the respective shutter in the second position. Each mobile portion can comprise an elastically deformable (e.g., substantially U-shaped) pallet, and each latching means can further comprise a detent element (e.g., a ledge) provided on the partition and cooperating with the associated pallet to releasably hold the respective shutter in the second position.

The partition preferably comprises a substantially rectangular plate-like central portion which constitutes the aforementioned wall between the two film chambers, and the exposure apertures of the respective covers are preferably rectangular and each thereof registers with the central portion of the partition. The exposure apertures can be slightly smaller than the central portion of the partition, and the cassette can further comprise deformable first and second frames or pads which surround the apertures in the respective covers and are sealingly interposed between such covers and the respective sides of the partition in the second positions of the covers. The frames or pads can be applied to the inner sides of the covers, namely, to those sides which face the partition in the second or closed positions of the covers. Such frames can consist of a suitable elastomeric material, e.g., a foamed synthetic plastic substance.

Still further, the improved cassette preferably comprises safety devices which are actuatable to hold the respective shutters against movement from their second positions so as to prevent accidental exposure of films to light or to other form of radiation. Each safety device can comprise a first portion which is integral with the partition and a second portion provided on the respective shutter and movable into engagement with the first portion. First and second resilient means can be provided to bias the second portions of the respective safety devices away from engagement with the first portions of such safety devices. The second portions of the safety devices can but need not be integral with the respective shutters, and the second portions of the safety devices can form part of the aforementioned ledge which forms (or can form) part of the aforediscussed latching means.

Each of the covers can be provided with means for indicating the presence and/or absence of a film in the respective chamber.

The novel features which are considered as characteristic of the invention are set forth in particular in the appended claims. The improved holder or cassette itself, however, both as to its construction and the mode of using the same, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a cut film cassette which embodies the invention;

FIG. 2 is a transverse sectional view substantially as seen in the direction of arrows from the line II—II of FIG. 1;

FIG. 3 is a similar transverse sectional view substantially as seen in the direction of arrows from the line III—III of FIG. 1;

FIG. 4 is a longitudinal sectional view substantially as seen in the direction of arrows from the line IV—IV of FIG. 1;

FIG. 5 is a fragmentary longitudinal sectional view substantially as seen in the direction of arrows from the line V—V of FIG. 1, the upper latching means being shown in the inoperative position; and FIG. 6 shows the structure of FIG. 5 but with the upper latching means in the operative position.

DESCRIPTION OF THE PREFERRED EMBODIMENTS

The cassette or holder which is shown in FIGS. 1 to 6 comprises a centrally located substantially rectangular section 1 (hereinafter called septum or partition) which has two mirror symmetrical sides and includes a rectangular central portion or wall 1a disposed between two film chambers F1 and F2, a transversely extending edge portion 1b, two longitudinally extending parallel and spaced-apart marginal portions 1g, 1h, and an elongated edge portion or ledge 1c which is disposed opposite the edge portion 1b and forms part of the latching means for two plate-like shutters 5, 6.

The coupling means for articulately connecting two frame-like covers 3-1, 3-2 to the partition 1 comprises two sets of three hinges 4 each and supports 1d which latter form part of the longitudinally extending marginal portions 1g, 1h. The arrangement is such (see particularly FIG. 2), that the supports 1d for the hinges 4 which carry the upper cover 3-2 are disposed at the underside of the partition 1 (on the marginal portion 1h), and that the supports 1d for the hinges 4 which carry the lower cover 3-1 are disposed at the upper side of the partition (on the marginal portion 1g).

The means for releasably locking the covers 3-1 and 3-2 to the partition 1 when the covers assume the illustrated closed positions includes movable locking portions 8 and stationary locking portions 1e. The stationary locking portions 1e which carry the movable (reciprocable) locking portions 8 for the lower cover 3-1 are disposed on the marginal portion 1h of the partition 1, and the stationary locking portions 1e which carry the movable locking portions 8 for the upper cover 3-2 are disposed on the marginal portion 1g of the partition. The hinges 4 for the cover 3-1 are disposed opposite the hinges 4 for the cover 3-2 and are staggered with reference to the locking portions 1e for the cover 3-2, as viewed in the longitudinal direction of the marginal portions 1g, 1h, and vice versa. The movable locking portions 8 for the upper cover 3-2 are not shown in FIG. 1; they are disposed at the underside of the partition 1 (see FIG. 3) and are located opposite the illustrated locking portions for the cover 3-1 but are staggered with reference to the hinges 4 for the cover 3-1.

The two pairs of mobile locking portions 8 are biased by coil springs 10 (note FIG. 3) to cooperate with the adjacent shoulders 3b of the covers 3-1 and 3-2 in maintaining the corresponding covers in their closed positions in which the cut films in the chambers F1 and F2 are confined between the respective sides of the central portion 1a of the partition 1 and the corresponding shutters 5, 6. The partition 1 is further formed with two circumferentially complete rectangular recesses or grooves 1f (one at each of its sides and each surrounding the respective film chamber) for reception of similarly configured circumferentially complete projections or ridges 3a at the inner sides of the adjacent covers 3-1 and 3-2 (see FIGS. 2 and 4). The projections 3a cooperate with the respective recesses 1f to form labyrinth passageways which prevent penetration of light into the respective chambers F1 and F2 between the covers 3-1, 3-2 and the respective sides of the partition 1. The inner sides of the covers 3-1 and 3-2 are further provided with radiation-intercepting frames or pads 7 which consist of a suitable elastomeric material, such as a foamed synthetic plastic substance, and surround the respective film chambers F1 and F2 to further reduce the likelihood of penetration of radiation into the film chambers when the covers are held in the illustrated closed positions. The frames 7 further surround the exposure apertures or windows 9 which are formed in the covers 3-1 and 3-2 and whose configuration resembles or matches that of the central portion 1a of the partition 1. The dimensions of the apertures 9 can be slightly smaller than those of the central portion 1a, and the latter is in register with both apertures when the covers 3-1 and 3-2 are held in their closed positions.

When the movable locking portions 8 are permitted to move under the action of the respective springs 10 and the covers 3-1 and 3-2 are held in the illustrated closed positions, substantially hook-shaped parts of the portions 8 engage the aforementioned shoulders 3b of the respective covers to hold the covers in the closed positions. The shoulders 3b are shown in FIG. 3. In order to move the cover 3-1 or 3-2 to its open position, the user shifts the movable portions 8 relative to the associated stationary portions 1e against the opposition of the respective spring or springs 10, and the thus released cover is then free to pivot relative to the partition 1 about the axis which is defined by the corresponding set of hinges 4.

FIGS. 2 and 3 further show that the covers 3-1 and 3-2 are formed with slots 3c which receive the marginal portions of the respective shutters 6 and 5 and wherein the shutters can slide between first positions in which the respective apertures 9 are exposed and second positions in which the shutters close the respective apertures to shield the cut films in the chambers F1 and F2 from radiation. The slots 3c surround the respective exposure apertures 9.

FIG. 4 shows the details of a handgrip portion 5a which is provided on the upper shutter 5 and it further shows a similar handgrip portion 6a on the lower shutter 6. The upper handgrip portion 5a is disengaged from the adjacent ledge 1c of the partition 1 while the lower handgrip portion 6a engages the ledge 1c. Each of the handgrip portions 5a and 6a comprises a U-shaped portion 12 forming part of a latching means which can releasably secure the respective shutter 5 and 6 to the partition 1. The portions 12 resemble yokes and consist at least in part of an elastomeric material and have deformable pallets 12a which can ride over the crest of the ledge 1c to engage one of the shoulders 1c' and to thus hold the corresponding shutter 5 or 6 in the closed position. If the user wishes to disengage the pallet 12a of the yoke 12 which is shown in FIG. 4 from the corresponding shoulder 1c', the lower leg of the yoke 12 is deformed by pushing it upwardly (as viewed in FIG. 4) so that the pallet 12a rises to a level above the ledge 1c, whereupon the upper shutter 5 can be moved to its open position in which the window or aperture 9 in the upper cover 3-2 admits radiation into the upper chamber F2. The ledge 1c can be said to constitute a detent element of each of the two latching means.

The handgrip portion 6a of the lower shutter 6 is staggered with reference to the handgrip portion 5a, as considered in the longitudinal direction of the ledge 1c, so as to enable the operator to deform the lower leg of the upper yoke 12 or to deform the upper leg of the lower yoke 12 preparatory to extraction or partial extraction of the corresponding shutter 5 or 6. An advantage of the latching means including the yokes 12 and the ledge or detent element 1c is that the shutters 5 and 6 are less likely to be accidentally moved to their open positions, i.e., the operator must knowingly deform the one or the other yoke 12 prior to being in a position to shift the shutter 5 or 6 from its closed position. The reference characters 5b and 6b denote slots or gaps which are formed in the corresponding handgrip portions 5a and 6a and respectively afford access to the upper leg of the yoke 12 on the handgrip portion 6a and to the lower leg of the yoke 12 on the upper handgrip portion 5a. FIGS. 4 to 6 further show sealing or light-intercepting strips 11 which are interposed between the partition 1 and the covers 3-1, 3-2 to prevent penetration of light into the corresponding chambers F1 and F2 between the partition 1 and the covers 3-1, 3-2 in the open positions of the respective shutters 5. The strips 11 can be coated with plush or with a similar soft material and are outwardly adjacent to the respective apertures 9, i.e., they are disposed to the left of such apertures, as viewed in FIG. 4.

The improved cassette is further provided with two safety devices which positively prevent movement of the shutters 5 and 6 from their closed positions until and unless the operator decides to actuate the mobile locking portions 8 and to pivot the covers 3-1 and 3-2 to their open positions. As can be seen in FIGS. 1, 5 and 6, each of the safety devices comprises a reciprocable portion or knob 13 which is a substantially U-shaped yoke and is reciprocably mounted in the respective handgrip portion 5a, 6a. The direction in which the movable portion 13 of a safety device can be moved from its inoperative to its operative position is indicated by arrow 14 which is shown in FIG. 6. Each of the movable portions 13 includes a hook-shaped element 15 which can engage the corresponding shoulder 1c' of the aforementioned ledge 1c on the partition 1 to thereby lock the element 15 to the partition. Springs 113 are provided to urge the movable portions 13 to the positions in which their elements 15 are disengaged from the ledge 1c. These springs bear against the handgrip portions 5a, 6a and react against the respective portions 13 of the corresponding safety devices so as to normally maintain the portions 13 out of engagement with the ledge 1c. Once a portion 13 is depressed in the direction of arrow 14, its hook-shaped element 15 engages the corresponding shoulder 1c' of the ledge 1c and thereby locks the respective shutter 5 or 6 in the closed position in which the corresponding window 9 is closed. The arrangement may be such that the movable portion 13 of a safety device is shifted in the direction of arrow 14 upon completion of an exposure, i.e., upon completion of exposure of a film in the respective film chamber F1 to light or to other form of radiation. At such time, the safety device locks the corresponding shutter 5 or 6 in the closed position and prevents renewed exposure of the film in the adjacent film chamber. Moreover, the depressed portion 13 of a safety device can serve as a means for indicating that the corresponding film is already exposed. Thus, all an operator has to do is to see or sense that the portion 13 of a safety device is depressed (i.e., that its hook-shaped element 15 engages the ledge 1c of the partition 1), and this informs the operator that the corresponding cut film is already exposed. The indication that the film is already exposed can be accentuated by distinctly coloring those parts (see 103 in FIG. 6) of the handgrip portions 5a and 6a which become visible on depression of the respective movable portions 13.

The covers 3-1 and 3-2 can be further provided with additional film presence or absence indicating means 16 (note the upper right-hand portion of FIG. 1) which can be constructed and installed in a manner as disclosed, for example, in the pending German Pat. application Ser. No. P 28 38 058.7.

The improved cassette can be manipulated in the following way:

The movable portions 8 of the locking means are moved against the opposition of the springs 10 to allow for movement of the covers 3-1 and 3-2 to their open positions while the cassette is located in a dark chamber. The arrangement is preferably such that the cassette is placed onto a table or an analogous support so that the underside of the cover 3-1 rests on the table. The locking means for the upper cover 3-2 are then disengaged and the upper cover is moved to its open position so as to allow for insertion of a cut film into the chamber F2. The frame or pad 7 at the underside of the cover 3-2 presses the film against the upper side of the partition 1 (i.e., against the upper side of the central portion 1a) as soon as the cover 3-2 is returned to its closed position. The cassette is then engaged along two parallel marginal portions and is turned through 180 degrees so that the other pair of locking portions 8 become accessible for disengaging the respective locks in order to enable the cover 3-1 (which is then located above the partition 1) to move to its open position preparatory to loading of a fresh cut film into the chamber F1. Such mode of loading the two film chambers with fresh cut film is possible because the covers 3-1 and 3-2 are of identical design but are mounted at the opposite sides of the partition 1 and are angularly offset by 180 degrees with reference to one another.

The thus loaded cassette is then transferred into a camera, an X-ray machine or the like, and the operator depresses the inner leg of one of the yokes 12 so as to allow for movement of the corresponding shutter 5 to its open position, i.e., one of the apertures 9 is ready to admit radiation against the corresponding film. The sealing strip 11 bears against the extended shutter 5 and the corresponding cover 3-1 or 3-2 to prevent penetration of light between such parts and into the corresponding film chamber. The sealing frame 7 prevents undesired penetration of light into the corresponding film chamber even if the exposed aperture 9 is located at the underside of the partition 1, i.e., the elasticity and compression of each frame 7 suffice to ensure that the films in the chambers F1 and F2 are biased against the respective sides of the central portion 1a irrespective of the orientation of the cassette. This holds true even if the cassette is held in a given position for a long period of time, namely, in a position in which one of the films is located at a level below the partition 1. Thus, the frames 7 positively prevent bulging of films in their chambers in directions away from the respective sides of the partition 1. When the exposure of a film is completed, the corresponding shutter 5 or 6 is returned to the illustrated position to close the corresponding window 9. The operator also actuates the corresponding safety device by depressing the mobile portion 13 so that the new position of the depressed portion 13 and/or the distinctly colored portion of the handgrip portion 5a or 6a denotes that one of the cut films is already exposed. At the same time, the depressed shutter 5 or 6 is locked in the closed position.

A second exposure can be made by reversing the position of the cassette in the camera and by thereupon retracting the corresponding shutter to the extended or open position.

When the exposed films are to be removed from their chambers, the cassette is moved to a dark chamber or is inserted into a film removing and film loading apparatus wherein the covers 3-1 and 3-2 are moved to open positions whereby the parts 13 are automatically disengaged from the ledge 1c so that the shutters 5 are again free to move between open or closed positions.

An important advantage of the improved cassette is that it can be manufactured and assembled at a reasonable cost. This is due to the fact that the partition 1 has two mirror symmetrical sides which renders it possible to use covers of identical design. The cassette can be used in medical photography or radiography as well as in cameras which employ cassettes for cut film. The films can be removed and inserted into the chambers F1 and F2 without necessitating removal or detachment of shutters from the respective covers. Still further, and since the covers are pivotable to open positions, the cassette can be used in a daylight system for automatic loading or removal of films.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A cassette for simultaneous reception of two cut films, comprising a centrally disposed partition having at least substantially mirror symmetrical first and second sides spaced-apart and first and second marginal portions; at least substantially identical first and second covers; first and second coupling means for movably connecting the respective covers to said partition so that each cover is movable between a first position in which it is remote from and a second position in which it is adjacent to and defines with the respective side of said partition a discrete film chamber; and first and second locking means for releasably holding the respective covers in their second positions, said first and second locking means being respectively disposed in the regions of said second and first marginal portions of said partition, wherein each of said covers has an exposure aperture, and further comprising first and second shutters installed in the respective covers, each of said shutters being movable between first and second positions in which the corresponding aperture is respectively exposed and closed.

2. The cassette of claim 1, wherein said covers have slots and said shutters are slidable in such slots between their first and second positions.

3. The cassette of claim 1, wherein each of said coupling means comprises at least one hinge and a support for the hinge, the supports of said first and second coupling means being respectively provided on the second and first marginal portions of said partition.

4. The cassette of claim 3, wherein said supports are integral with the respective marginal portions of said partition.

5. The cassette of claim 1, wherein each of said locking means comprises at least one mobile portion and a stationary portion provided on said partition, the stationary portions of said first and second locking means being respectively provided at the second and first sides of said partition.

6. The cassette of claim 5, wherein the stationary portions of said first and second locking means are respectively provided on the second and first marginal portions of said partition.

7. The cassette of claim 6, wherein each of said coupling means comprises at least one hinge and at least one support for the hinge, the supports of said first and second coupling means being respectively disposed at the second and first sides of said partition and being respectively provided on said second and first marginal portions.

8. The cassette of claim 7, wherein said marginal portions are elongated and the supports of said first and second coupling means are respectively staggered with reference to the mobile portions of said second and first locking means, as considered in the longitudinal direction of said marginal portions.

9. The cassette of claim 7, wherein the stationary portion of said first locking means is disposed opposite the stationary portion of said second locking means.

10. The cassette of claim 1, wherein each of said coupling means comprises a hinge leaf provided on the respective cover and a support for the hinge leaf provided on said partition.

11. The cassette of claim 10, wherein said supports are integral with said partition and the supports of said first and second coupling means are respectively disposed at the second and first sides of said partition.

12. The cassette of claim 1, wherein each side of said partition has a substantially circumferentially complete recess and each of said covers has a substantially circumferentially complete projection extending into the respective recess in the second position of the respective cover to prevent the penetration of radiation between said partition and said covers and into the respective chambers in the second positions of the covers.

13. The cassette of claim 1, wherein said partition includes a substantially rectangular central portion constituting one wall of each of said chambers and each of said covers has a substantially rectangular exposure aperture in register with said central portion.

14. The cassette of claim 1, wherein each of said covers has an exposure aperture and further comprising substantially plate-like first and second shutters reciprocably installed in the respective covers and each movable between first and second positions in which the corresponding apertures are respectively exposed and closed, and first and second safety devices actuatable to hold the respective shutters against movement from their second positions.

15. The cassette of claim 14, wherein each of said safety devices comprises a first portion integral with said partition and a second portion provided on the respective shutter and movable into engagement with the respective first portion.

16. The cassette of claim 15, further comprising first and second resilient means for biasing the respective second portions away from engagement with the respective first portions of said safety devices.

17. The cassete of claim 16, wherein said second portions are movable with reference to the respective shutters.

18. The cassette of claim 6, wherein said partition has a ledge and said first portions of said safety devices form part of said ledge.

19. The cassette of claim 1, wherein each of said covers is provided with means for indicating the presence or absence of a film in the respective chamber.

20. A cassette for simultaneous reception of two cut films, comprising a centrally disposed partition having at least substantially mirror symmetrical first and second sides spaced-apart and first and second marginal portions; at least substantially identical first and second covers; first and second coupling means for movably connecting the respective covers to said partition so that each cover is movable between a first position in which it is remote from a second position in which it is adjacent to and defines with the respective side of said partition a discrete film chamber; and first and second locking means for releasably holding the respective covers in their second position, said first and second locking means being respectively disposed in the regions of said second and first marginal portions of said partition, wherein each of said covers has an exposure aperture and a marginal portion provided with a slot, and further comprising substantially plate-like first and second shutters movable in the slots of the respective covers between first and second positions in which they respectively expose and close the corresponding apertures.

21. The cassette of claim 20, wherein each of said shutters has a handgrip portion and further comprising first and second latching means for releasably holding said first and second shutters in the second positions thereof.

22. The cassette of claim 21, wherein each of said latching means comprises a mobile portion provided on the respective shutter and cooperating with said partition to releasably hold the respective shutter in the second position.

23. The cassette of claim 22, wherein each of said mobile portions comprises an elastically deformable pallet and each of said latching means further comprises a detent element provided on said partition and cooperating with the pallet to releasably hold the respective shutter in the second position.

24. The cassette of claim 23, wherein said mobile portions are substantially U-shaped and said detent elements form part of a ledge provided on said partition.

25. A cassette for simultaneous reception of two cut films, comprising a centrally disposed partition having at least substantially mirror symmetrical first and second sides spaced-apart and first and second marginal positions; at least substantially identical first and second covers; first and second coupling means for movably connecting the respective covers to said partition so that each cover is movable between a first position in which it is remote from and a second position in which it is adjacent to and defines with the respective side of said partition a discrete film chamber; and first and second locking means for releasably holding the respective covers in their second positions, said first and second locking means being respectively disposed in the regions of said second and first marginal portions of said partition, wherein said partition includes a substantially rectangular central portion constituting one wall of each of said chambers and each of said covers has a substantially rectangular exposure aperture in register with said central portion and wherein said exposures apertures are slightly smaller than said central portion and further comprising first and second deformable frames surrounding the apertures of the respective covers and sealingly interposed between such covers and the respective sides of the partition in the second positions of said covers.

26. The cassette of claim 25, wherein said covers have inner sides facing said partition in the second positions of said covers, said frames being provided at the inner sides of the respective covers.

27. The cassette of claim 26, wherein said frames consist of an elastomeric material.

28. The cassette of claim 26, wherein said frames consist of foamed elastomeric material.

* * * * *